DIGITAL-ANALOGUE SIGNAL CONVERTER

Filed Aug. 18, 1964 2 Sheets-Sheet 1

Inventor
Y. OHASHI
By Walter J. Baum
Attorney

DIGITAL-ANALOGUE SIGNAL CONVERTER

Filed Aug. 18, 1964 2 Sheets-Sheet 2

Inventor
Y. OHASHI
By Walter J. Baum
Attorney

United States Patent Office 3,396,380

Patented Aug. 6, 1968

3,396,380

DIGITAL-ANALOGUE SIGNAL CONVERTER

Yasutaka Ohashi, Tokyo, Japan, assignor to Nippon Electric Company, Limited, Tokyo, Japan, a corporation of Japan Filed Aug. 18, 1964, Ser. No. 390,374
Claims priority, application Japan, Aug. 26, 1963, 38/45,589
21 Claims. (Cl. 340—347)

ABSTRACT OF THE DISCLOSURE

A PCM digital to analogue converter having a source of digits, a DC supply responsive to the highest order digit for selecting a positive or a negative output, first and second converters responsive to succeeding digits for producing first and second analogue signals, respectively, resistors responsive to an additional digit for variably attenuating the second analogue signal under control of a characteristic of the first analogue signal, and a device for combining the first analogue signal and the attenuated second analogue signal into a composite analogue signal having a polarity determined by the selected polarity of the DC output.

This invention relates to a pulse code modulation (PCM) decoder-encoder or to a digital-analogue converter which may be of the feedback type and which has non-linear quantization characteristics and wherein the decoder-encoder or converter can be used as a local decoder.

Feedback type encoders, mentioned above, are described in an article by B. D. Smith in the "Proceedings of the Institute of Radio Engineers," vol. 41 (1953), pp. 1053–1058 (August issue). As disclosed in this article, feedback type encoders can be provided with a compression characteristic (to improve the signal-to-noise ratio) by imposing a non-linear expansion characteristic upon the local decoder therein. However, it should be noted that the encoder described in this article uses an electronic switch (a transistor or a diode) as the switch element which creates serious errors because of temperature dependence and because changes in the residual voltage and the inverse current occur for small analogue signals requiring small quantization steps. It should also be noted that inasmuch as the non-linear expansion characteristic of the local decoder described in said article is a hyperbolic function given by $$y=x/[1+h(1-x)] \qquad (1)$$

where $x$ is a digital variable normalized to values between 0 and 1, $y$ is an analogue variable corresponding to the digital variable $x$, and $h$ is an arbitrary parameter), an improvement in the signal-to-quantization-noise ratio in the low input signal region will cause the impairment to the signal-to-quantization-noise ratio in the high input signal region for a voice signal, for example. Moreover, the parameter $h$ in Equation 1 must be equal to about twenty upon encoding a voice signal and consequently only a small analogue output can be obtained from the local decoder as compared with the current flowing through the switch element.

Prior art devices provided an encoder with a non-linear compression characteristic by use of a combination of an encoder having a linear encoding characteristic and an expander (including a non-linear circuit element, such as a vaccum tube or a diode or transistor or other semiconductor element). However, in these conventional encoders, the non-linearities of the non-linear circuit elements depend on the temperature, age, etc. of the components which result in variations in output. Thus, the non-linear encoding characteristic is subject to temperature variation, variation with age, etc. and, therefore, different encoders or the same encoder with different non-linear circuit elements will have variable non-linear encoding characteristics.

An object of the invention is therefore to provide a digital-analogue signal converter, which introduces substantially no errors when low level input signals are supplied even if an electronic switch is used, as the switch element.

Another object of this invention is to provide a digital-analogue, analogue-digital converter which has an improved $S/N$ ratio for both high and low level input signals and which produces large output signals. Still another object of this invention is to provide a converter as described which is stable and is not effected by fluctuation and discrepencies in the characteristics of the circuit elements per se.

According to a feature of the present invention there is provided an improved digital-analogue signal converter in which the residual voltage or inverse current of the electronic switch element in the decoder does not introduce errors during signal conversion. This is achieved by separately decoding groups of an imput digital signal which has been divided into $2^m$ level regions (according to one or more bits positioned in higher digit positions of the input digital signal) by means of the same or different types or decoders so as to expand the decoded outputs corresponding to low level input digital signals and by thereafter compressing the outputs into predetermined levels by means of attenuators.

According to another feature of the invention there is provided a digital-analogue signal converter in which the signal-to-quantization-noise ratio at the lower input signal level region is improved without deteriorating the signal-to-quantization-noise ratio at the higher signal level region. This is achieved by virtue of the fact that division of the input signal into $2^m$ level regions according to one or more bits positioned in higher digit positions makes it possible to decode the input digital signal by means of decoders whose non-linear parameters are selected individually to correspond with the respective regions.

According to still another feature of the invention there is provided a digital-analogue signal converter in which larger decoder analogue output signals are obtained than in conventional encoders. Consequently, encoding of analogue signals with greater accuracy can be achieved due to the fact that decoding of the input digital signal (divided into said $2^m$ level regions) makes it possible for the non-linearity parameter $h$ in Equation 1 to have a value which is much less than twenty and which in practice may equal to about one to six in each of the decoders.

According to still another feature of the invention there is provided a simplified economical digital-analogue signal converter in which only one decoder can be used for the respective regions and wherein the non-linearity parameters can be selected to be independent for each region despite the fact that the input digital signal is decoded separately for the portions of the input digital signal which has been divided into $2^m$ level regions.

According to a further feature of the invention there is provided a digital-analogue signal converter whose non-linear characteristic is not dependent on the non-linearity of an active circuit element, such as a vacuum tube, a transistor, a diode, etc.

According to still another feature of the invention, there is provided a digital-analogue signal converter in which any type of decoder can be used to carry out the decoding into the $2^m$ regions of the input digital signal in accordance with one or more bits positioned in higher order digit positions.

According to a still further feature of the invention, there is provided a digital-analogue signal converter which includes means for inverting the polarity of the output analogue signal between positive and negative values in accordance with the bit in the highest digit position of the input digital signal so that the converter may provide an output analogue signal which extends over both positive and negative regions.

The above-mentioned and other features and objects of this invention and the means of attaining them will become more apparent and the invention itself will be best understood by reference to the following description of embodiments of the invention taken in conjunction with the accompanying drawings in which.

Figure 1:
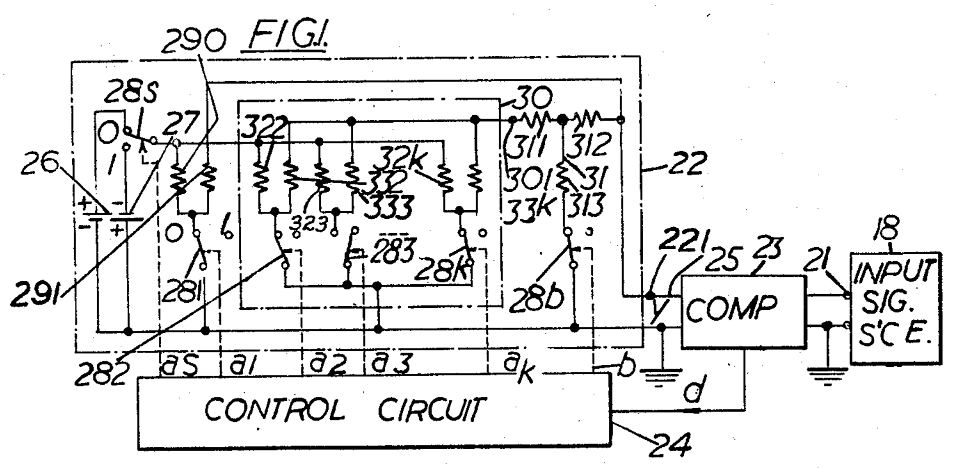
FIG. 1 is a circuit diagram, partly in a block form, of an encoder wherein a digital-analogue converter of the invention is used as the local decoder.
Figure 2:
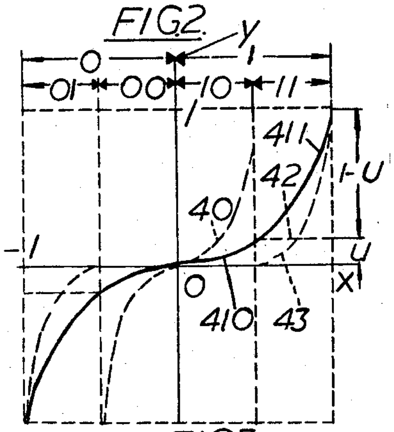
FIG. 2 is a graph illustrating a normalized value of the expansion characteristic of the decoder according to the invention.

Referring to FIG. 1, there is illustrated therein an embodiment of the invention which is believed to be in the most practical form. The digital signal is supplied to the local decoder and is divided therein into four regions ($m=2$). FIG. 2 illustrates the expansion characteristic curve of the local decoder in FIG. 1 and the divisions of the input digital signals. More particularly, FIG. 1, is an encoder which is similar to the encoder disclosed in FIG. 4 on p. 1054 of the above-mentioned article in the "Proceedings of the Institute of Radio Engineers." However, the encoder of this invention differs in the encoding of the two highest digits. The encoder of FIG. 1 includes an-analogue signal input terminals 21 which are supplied with an input analogue signal from input source 18 which is to be converted into a digital signal. A local decoder 22 produces in sequence within a sampling time interval, an output analogue signal $y$ corresponding to the desired time positioned serially arranged digital signals. A current comparator 23 is provided to compare, in time sequence, the output signal $y$ of the local decoder 22 and the input analogue signal from source 18 and to generate an error signal $d$ indicating which of the signals is larger than the other. A control circuit 24 connected to the output of comparator 23 produces control outputs $a_s$, $a_1$, $a_2$, $a_3$, . . . , $a_k$, and $b$ which control the local decoder 22 (in response to the error signal $d$ derived by current comparator 23) such that the output analogue signal $y$ can approach the input analogue signal when compared on a time basis. While FIG. 1 illustrates that one lead of the input terminal pair 21 is grounded and that the output analogue signal $y$ from the local decoder 22 is applied via lead 25, and then through the input impedance of the comparator 23 (not shown) and the ground lead back to the local decoder 22, it should be understood that these grounds as well as the grounds hereinafter referred to, may be a point at any other reference potential. According to the invention, the local decoder 22 includes the D.C. power sources 26 and 27 which have the same absolute potential $E_0$ but are opposite in polarity to each other and a sign transfer switch **28*s* which switches between the D.C. power sources 26 and 27 in response to the sign control output $a_s$ of the control circuit. Output $a_s$ indicates the sign of polarity of the input analogue signal. Resistors 290 and 291 are connected serially between the sign transfer switch 28*s* and the local decoder output terminal 221. A region transfer switch 281 connects or disconnects the junction point between resistors 290 and 291 to the ground lead in response to region control output $a_1$ from control circuit 24 which indicates whether the absolute value of the input analogue signal is larger or smaller than the region. A Smith type weighted-resistor-switch circuit 30 is connected to the sign transfer switch 28*s*. Resistors 311, 312, and 313 are inserted between output terminal 301 of the weighted-resistor-switch circuit 30 and the local decoder output terminal 221. These resistors constitute a resistor attenuator generally indicated as 31. An attenuator transfer switch 28*b* transfers the attenuation of the resistor attenuator 31** in response to an attenuation control output $b$.

The Smith type weighted-resistor-switch circuit 30 includes the digit code switches 282, 283, . . . , and **28*k*. Each of these switches is provided with "zero" contact 0 and "one" contact 1 and each is switched between said contacts depending upon whether each of the digit code control outputs $a_2$, $a_3$, . . . , and $a_k$ is a control output corresponding to a digital binary zero or a digital binary one. Each of the first weighted resistors 322, 323, . . . , and 32*k* has one end thereof connected to the "zero" contacts 0 of the respective digit code switches 282, 283, . . . , and 28*k*, and the other end thereof connected in common to the sign transfer switch 28$_s$. These first weighted resistors have successively increasing weighted resistances starting from the lowest resistance $mR_1$ for resistor 322 which is connected to the next-to-the-highest digit code switch 282 (which is adapted to be controlled by the next to the highest digit code control output $a_2$ corresponding to the next to the highest digit code in the input digital signal, $2mR_1$, . . . , and $2^{k-3}mR_1$, to $2^{k-3}mR_1$). Moreover, second weighted resistors 332, 333, . . . , and 33*k* are provided and connected such that each has one end thereof connected to the "zero" contacts 0 of the respective switches 282, 283, . . . , and 28*k*. The other ends of said second weighted resistors are connected in common to the weighted-resistor-switch circuit output terminal 301. These second weighted resistors have successively increasing weighted resistances starting from a resistance of $R_1$ for the resistor 332 (which is connected to the next to the highest digit code switch 282**) through $2R_1$, . . . , and $2^{k-3}R_1$, to $2^{k-2}R_1$.

Although the switches **28*s*, 281, 282, 283, . . . , 28*k* and 28*b*** are represented in FIG. 1 as mechanical switches it should be noted that electronic switches including diodes or transistors can be and are used in actual practice as these switches.

The principle of operation of the invention will now be described in detail with reference to both FIGS. 1 and 2. At the beginning of a sampling period, the respective switches are reset to the "zero" contacts 0, and no local decoder output is present. At the next time point, if the input analogue signal is positive so that the digital signal $x$ falls within the region designated by the reference "1" in FIG. 2, the sign transfer switch **28*s* will be switched to its "one" contact 1 under the control of the sign control output $a_s$. If, however, the input analogue signal is negative so that the digital signal $x$ falls within the region designated by the reference "0" in FIG. 2, then switch 28*s* will remain connected to its "zero" contact 0 under the control the sign control output $a_s$. At the same time, the region transfer switch 281 and the attenuator transfer switch 28*b* are connected to their "one" contacts 1 regardless of the sign of the input analogue signal X to thereby supply to the local decoder output terminal 221** a bias current which will permit a discrimination to be made as to the regions (designated by the reference "00," "01," "10" and "11" of FIG. 2) in which the digital signal $x$, corresponding to the input signal, falls.

Further, if at the next point, the digital signal $x$ falls within the region "00" or "10," then the region transfer switch 281 and the attenuator transfer switch 28b will be connected to their "zero" contacts. If on the other hand, the digital signal $x$ falls within the region "01" or "11," then switches 281 and 28b will be connected to their "one" contacts. At the same time, the next to the highest order digit code switch 282 is connected to its "one" contact regardless of the value of the digital signal $x$.

At the subsequent time point, the sign, region, and attenuator transfer switches 28s, 281, and 28b are kept in the state they assumed at the preceding time point. The next to the highest order digit code switch 282 is connected to its "zero" contact or "one" contact according to the determination made by the comparator 23, and at the same time the digit code switch 283 for the next succeeding digit is connected to its "one" contact regardless of the value of the digital signal $x$.

These operations are repeated until the operation for the lowest order digit code switch 28k has been completed. Thereafter, all the switches are reset to their "zero" contacts.

A summary of the operation of FIG. 1 with reference to FIG. 2 follows. If the input analogue signal is positive and the corresponding digital signal $x$ falls within the region "10," the weighted-resistor-switch circuit 30 will produce analogue output signals which are represented in FIG. 2 by the dashed curve 40 and these output signals will be attenuated by means of the attenuator 31 to provide the output analogue signal $y$ represented by a solid-line curve 410. Consequently, the effect of the residual voltage and the inverse current of the switch elements in the weighted-resistor-switch circuit 30 will become greatly compressed. On the other hand, if the input analogue signal is positive and the digital signal $x$ falls within the region "11," the resistors 290 and 291 will provide a bias current (shown by a dashed straight line 42) to which the analogue output signal of the weighted-resistor-switch circuit 30 represented by curve 43 is added. Thus, the resulting output (curve 42 plus curve 43) is in an output analogue signal $y$ represented by curve 411. It is apparent therefore that the improvement in the absolute error is not as good for this case as for the case where the input analogue signal falls within the region "10." This is so because of the fact that in the present case, the residual voltage and the inverse current of the switch elements in the weighted-resistor-switch circuit 30 is applied to the comparator 23 through the series resistors 311 and 312. It should be noted however, that the absolute error for region 11 relatively does not have to be improved as much as that in the region "10" because the quantization steps in the region "11" are coarse due to the non-linear characteristic. This explanation will also apply to negative input analogue signals.

Figure 3:
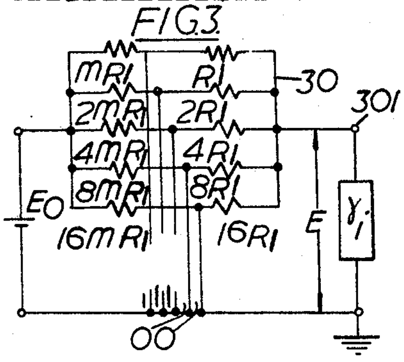
FIG. 3 is a diagram illustrating a modified form (for a given input digital signal) of a weighted-resistor-switch circuit in the digital-analogue signal converter of the invention.
Figure 4:
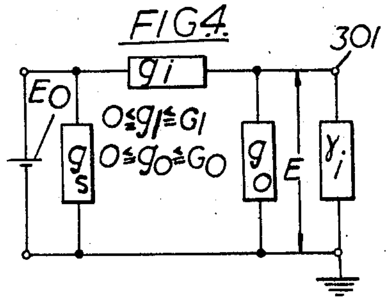
FIG. 4 is the equivalent circuit for the circuit shown in FIG. 3 and is given in order to define the two conductances $g_1$ and $g_0$ which characterize the state of the weighted-resistor-switch circuit.

Reference will now be made to FIGS. 1, 3, and 4 to illustrate that the parameter $h$ in Equation 1 need not be the same for the regions "10" and "11" in FIG. 2 and that said parameter may be separately selected for each region to give the optimum $S/N$ characteristic. It will now be assumed that a first load resistance (including the resistors 311, 312, and 313 and the input impedance of the comparator 23) connected between the weighted-resistor-switch circuit output terminal 301 and ground is designated by $r_1$; and that a second load resistance (including the resistors 311 and 312 and the input impedance of the comparator 23) connected between the same output terminal 301 and ground is designated $r_2$.

If it is also assumed that the weighted-resistor-switch circuit 30 processes a digital signal consisting of five bits and if the digital signal (11100) is applied to circuit 30 to control the digit code switches 282, 283, . . . , 28k (which is the switch 286 in this case) then the circuit 30 will assume the state shown in FIG. 3. As a result, it is possible to represent the weighted-resistor-switch circuit 30 by an equivalent circuit shown in FIG. 4, wherein some of the resistors are shown as a lumped admittance. If two of such admittances (conductance, in this case) are represented by $g_1$ and $g_0$ indicated in FIG. 4, then these admittances can in general each be defined as a function of the input digital signal. Thus, they may be designated as $g_1(x)$ and $g_0(x)$, respectively, where $x$ is the normalized input digital signal ($0 \leq x \leq 1$, because this weighted-resistor circuit 30 processes a signal of only one polarity). Incidentally, another conductance $g_s$ connected in shunt across the power source $E_0$ in FIG. 4 (that is, parallel resistors $8mR_1$ and $16mR_1$, for example, shown in FIG. 3), has no effect upon the output potential E.

If the admittance $g_0(x)$ becomes $G_0$ when all the switches in the weighted-resistor-switch circuit 30 are conneced to their "zero" contacts, then $$G_0=(2^{k-1}-1)/2^{k-2}R_1) \qquad (2)$$

follows. If the admittance $g_1(x)$ becomes $G_1$ when the switches are all connected to their "one" contacts, then:

$$G_1=(2^{k-1}-1)/[(1+m)2^{k-2}R_1] \qquad (2')$$

follows. Inasmuch as the resistances of the weighted resistors 322, 332, 323, 333. . . ., 32k, and 33k are selected in the manner mentioned above, the admittance $g_0(x)$ and $g_1(x)$ can generally be given as follows:

$$\left.\begin{aligned} g_0(x)&=G_0\cdot(1-x) \\ \text{and} \quad g_1(x)&=G_1\cdot x \end{aligned}\right\} \qquad (3)$$

when the weighted-resistor-switch circuit 30 is supplied with control inputs $a_2$, $a_3$, . . ., and $a_k$ which corresponds to $k-1$ digit codes representing the normalized digital variable $x$ of Equation 1. If E represents the potential of the weighted-resistor-switch circuit output terminal 301, it will be seen from the equivalent circuit (FIG. 4) that the circuit equation for the local decoder 22 is $$(E_0-E)g_1-E(1/r_i+g_0)=0 \qquad (4)$$

where $r_i$ stands for $r_1$ and $r_2$. Solving Equation 3 with respect to the output potential E of the weighted-resistor-switch circuit produces:

$$E=E_0\cdot A\cdot x/(B-Cx) \qquad (5)$$

where the coefficients A, B, and C are given by $$\left.\begin{aligned} A&=r_i\cdot G_0 \\ B&=(1+m)(1+r_i\cdot G_0) \\ \text{and} \quad C&=m\cdot r_i\cdot G_0 \end{aligned}\right\} \qquad (6)$$

respectively. If a normalized output level $y$ is used for the output level of the local decoder 22 then by multiplying the potential E of Equation 5 by $(B-C)/(E_0\cdot A)$, so that the output potential E of the weighted-resistor-switch circuit is unity when the normalized digital variable $x$ is unity, then Equation 7 follows:

$$y=x/[1+C(1-x)/(B-C)] \qquad (7)$$

It follows, therefore, that if the coefficients B and C are selected to satisfy a relation $$C/(B-C)=h \qquad (8)$$

then Equation 7 coincides with Equation 1. Substitution of Equation 6 into Equation 8 results in:

$$h=m\cdot r_i\cdot G_0/(1+m+r_i\cdot G_0) \qquad (9)$$

Therefore, it is possible (even with the same weighted-resistor-switch circuit 30) to vary the non-linear characteristic represented by the Equation 1 by changing the load resistance $r_1$ connected to the weighted-resistor switch circuit output terminal 301.

If the values of $h$ in the regions "10" and "11" shown in FIG. 2 are represented by $h_1$ and $h_2$, respectively, the necessary relation to be retained between these values is that the differential coefficients of both curves are the same at the junction between the regions "10" and "11." This results in a non-linear characteristic which is continuous up to its first differential coefficient.

Inasmuch as the $x$-axis of curve 40 in FIG. 2 is compressed down to a half, then $$y=2x'/[1+h_1(1-2x')] \quad (10)$$

is the equation for this curve. If curve 410 is obtained by multiplying the curve 40 by $u$, then $$y=2ux'/[1+h_1(1-2x')] \quad (11)$$

is the equation for this curve. Similarly, inasmuch as the curve 411 consists of the sum of the straight line 42 and the curve 43 as multiplied by $(1-u)$, the equation for the curve 43 will be:

$$y=(2x'-1)/[1+2h_2(1-x')] \quad (12)$$

which results from the fact that this curve has its $x$-axis compressed by a half and its origin shifted to the right by ½, and therefore:

$$y=u+(1-u)(2x'-1)/[1+2h_2(1-x')] \quad (13)$$

is the equation for the curve 411. Differentiation with respect to $x'$ produces:

$$dy/dx'=2u(1+h_1)/[1+h_1(1-2x')]^2 \quad (14)$$

and $$dy/dx'=2(1-u)(1+h_2)/[1+2h_2(1-x')]^2 \quad (15)$$

from Equations 12 and 13, respectively. The condition for Equations 14 and 15 to be equal to each other at $x'=½$ is $$u(1+h_1)=(1-u)/(1+h_2) \quad (16)$$

In general, the required non-linear characteristic is determined by the $S/N$ characteristic for the dynamic range of the input signal. For this purpose, the differential coefficients for $x'=0$ and $x'=1$ serve as important parameters. By inserting $x'=0$ in Equation 4 and $x'=1$ in Equation 15, the following results are produced:

$$(dy/dx')_{x'=0}=2u/(1+h_1) \quad (17)$$

and $$(dy/dx')_{x'=1}=2(1-u)(1+h_2) \quad (18)$$

Figure 5:
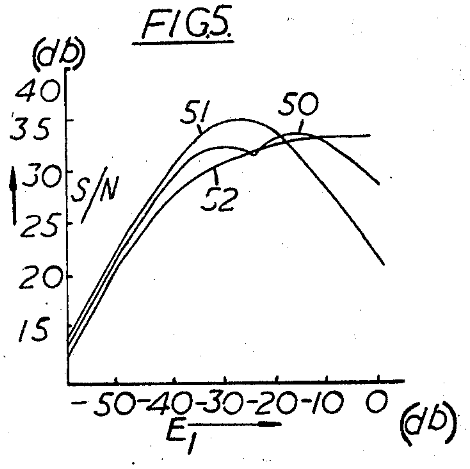
FIG. 5 is a graphic representation of signal-to-noise ratios which will assist in the understanding of the advantages to be obtained by this invention.

If $$(dy/dx')_{x'=0}=1/21$$

and $$(dy/dx')_{x'=1}=9$$

are selected as the boundary conditions as $x'=0$ and $x'=1$ so that sufficient improvement in the S/N ratio at both the higher and lower levels can be achieved, then the common junction between the two regions may easily be realized, for example, by choosing values as follows $$u=0.0678, \quad h_1=1.85, \quad \text{and } h_2=3.83 \quad (19)$$

from Equations 16, 17, and 18. The relation of the $S/N$ ratio versus the input level $E_I$ in the above case is shown by curve 50 in FIG. 5 where $S/N$ is plotted on the ordinate axis vs. values of $E_I$ in db on the abscissa axis. For reference, the $S/N$ characteristic for the hyperbolic characteristic according to the previously mentioned article by B. D. Smith in which $h=20$, is illustrated by curve 51 in FIG. 5. The $S/N$ characteristic for the logarithmic characteristic where the parameter "mu" is 100, is shown by another curve 52. It will be obvious from FIG. 5 that the $S/N$ characteristic according to the present invention combines the desirable portions of the hyperbolic characteristic and the logarithmic characteristic to maintain a favorable $S/N$ ratio over a wide part of the dynamic range.

In addition, the fact that $u=0.0678$ in Equation 19 means that within the region "10" in FIG. 2, the error caused by the residual voltage and the inverse current of the switch elements in the weighted-resistor-switch circuit 30 in FIG. 1 has been compressed by a factor of 0.0678, and therefore the degree of improvement is a factor of about 15. Furthermore, although no improvement in an absolute error exists within the region "11" in FIG. 2, the lowest quantization step in this region is about eight times as large as that in the region "10", and therefore the improvement in the relative error is a factor of about 8.

Incidentally, the fact that $h_1$ and $h_2$ in Equation 19 are smaller than the value of $h$ for the hyperbolic characteristic and that the number of digits is reduced by one, simplifies the design of the weighted-resistor-switch circuit and consequently makes it possible to increase accuracy as well as the speed of operation of said switch.

It is to be noted that from the practical point of view (for the above-described reasons) the present invention permits the use of not only transistors but also of diodes as the switch elements in the weighted-resistor-switch circuit. Diodes are more economical than transistors and their use makes it possible to improve the effect of the inverse current as compared with the case wherein a transistor is used.

In the embodiment of the invention described hereinabove, the input signal is divided into four regions and the encoding of the first digit is accomplished by switching between the positive and negative power sources. Moreover, the second digit is encoded by means of a bias current, and the encoding of the remaining digits is then accomplished by means of a weighted-resistor-switch circuit. However, it should be understood that the inventive concept of this invention is broader than the example. Thus, generally speaking it is possible to divide the input signal into $2^m$ regions, and to encode the first digit by switching between positive and negative power sources. The next succeeding $(m-1)$ digits can be encoded by means of bias currents, and the remaining digits by means of a weighted-resistor-switch circuit (however, in this case the circuit arrangement will become quite complex). Alternatively, it would also be possible to have two or more pairs of power sources, which are switched so that a positive low value input signal switches only one power source and a high level signal switches two sources (and vice versa for negative signals).

Figure 6:
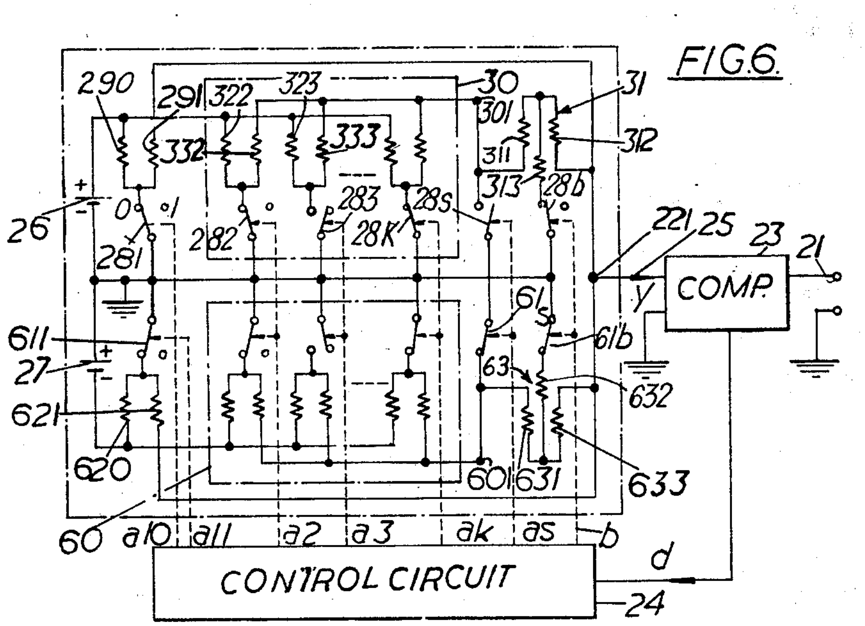
FIGS. 6 and 7 are circuit diagrams, partly in block form, of alternative embodiments for the embodiment shown in FIG. 4.

Referring to FIG. 6, there is illustrated an embodiment in which the dipolar switches shown in FIG. 1 are replaced by monopolar switches. Additionally, FIG. 6 does not transfer between the power sources 26 and 27 by means of the switch 28$s$ (as shown in FIG. 1). Rather FIG. 6 provides either a positive or negative output signal by merely short-circuiting or opening the weighted-resistor-switch circuit output terminal 301 and another output terminal 601 of another weighted-resistor-switch circuit 60 by means of sign transfer switches 28$s$ and 61$s$, respectively. Furthermore, in order to supply the bias current in FIG. 6, region transfer switches 281 and 611 are opened or closed under the control of separate region control signals $a_{10}$ and $a_{11}$, respectively, depending upon the polarity of the input signal. With regard to the balance of the circuit of FIG. 6, it is to be noted that this circuit is equivalent to a double arrangement of the local decoder 22 in FIG. 1. Consequently, reference numerals 60, 601, 620, 621, 63, 631, 632, 633, and 61$b$, in switch 60 of FIG. 6 correspond to reference numerals, 30, 301, 290, 291, 31, 311, 313, 312, and 28$b$, respectively in switch 30 of FIG. 1.

Figure 7:
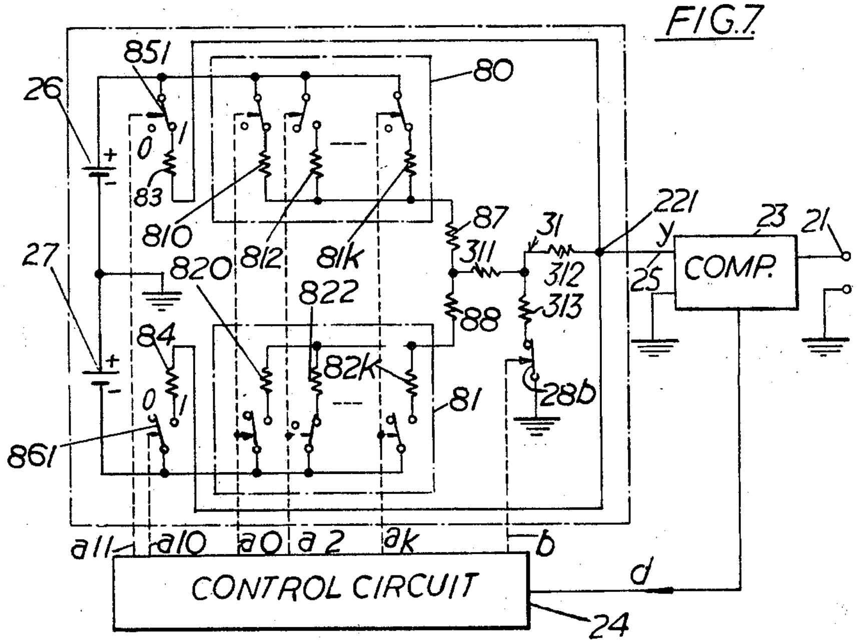

Referring to FIG. 7, there is illustrated therein an alternative embodiment of this invention in which a weighted-resistor-switch circuit, other than a Smith type switch is utilized. In FIG. 7, weighted-resistor-switches 80 and 81 are complementary parallel type circuits. The resistances of weighted resistors 810, 812, . . ., 81$k$ and 820, 822, . . ., 82$k$ have weighted values of $R_1$, $2R_1$, . . ., and $kR_1$, respectively. Resistors 83 and 84 are provided to supply a bias current, whenever the region transfer switches 851 and 861 connect the sources 26 and 27, respectively, thereto. The switches 851 and 861 are responsive to separate region control signals $a_{11}$ and $a_{10}$, respectively, depending upon the polarity of the input signal. Resistors 87 and 88 are inserted in series with the parallel-type weighted-resistor-switch circuit 80 and 81 to provide them with the non-linear characteristics. In this particular embodiment, all the switches other than switch 28$b$ can be monopolar switches. However, the $S/N$ characteristic over the dynamic range is less regular than that of the previously illustrated embodiments.

In the previously explained embodiments of the invention, the polarity of the output analogue signal may be transferred between positive and negative potentials according to the highest digit of the input digital signal. However, if the signal to be processed is limited to one which has only one polarity, then said means for transferring the polarity will be unnecessary. Therefore, it will be apparent that the inventive concept of the present invention will be operative even if the converter has this part omitted.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A digital to analogue signal converter comprising:

(a) a digital input source for supplying electrical signals representative of a plurality of digits;

(b) first converter means connected to said source and responsive to the two highest order digits of which one has a significant polarity for producing a first analogue signal;

(c) second converter means responsive to the remaining supplied digits for producing a second analogue signal;

(d) variable attenuator means connected to receive and attenuate said second analogue signal under control of a characteristic of said first analogue signal; and (e) means for adding said first analogue signal to the attenuated second analogue signal to provide a composite signal having a polarity determined by the significant polarity of the one highest order digit.

2. A digital to analogue signal converter comprising:

(a) a digital signal input source for supplying electrical signals representative of more than two digits;

(b) polarity determining means connected to said source and responsive to the highest order digit supplied for determining the polarity of the supplied digital signal;

(c) first converter means connected to said source and responsive to at least the second highest order digit supplied for producing a first analogue signal;

(d) second converter means connected to said source and responsive to the remaining digits of the supplied input signal for producing a second analogue signal;

(e) variable attenuator means connected to receive and attenuate said second analogue signal under control of a characteristic of said first analogue signal; and (f) combining means for combining said first analogue signal and said variable attenuated second analogue signal into a composite signal having a polarity as determined by said polarity determining means.

3. A digital to analogue converter as set forth in claim 2 wherein said polarity determining means includes at least one DC power supply means and switch means responsive to said highest order digit for selectively connecting the terminals of said power supply to said combining means.

4. A digital to analogue converter as set forth in claim 3 wherein said polarity determining means, said variable attenuator means and said combining means each includes a first and second identical circuit portion, all said first circuit portions being connected to the positive power supply terminal of said DC supply means and all the second circuit portions being connected to the negative power supply terminal of said DC power supply means and wherein said first and second circuit portions each product an output in response to the input digital signals and wherein the combining means includes means responsive to the polarity determining means for blocking the output from one of said first and second circuit portions.

5. A digital to analogue converter as set forth in claim 3 wherein said first converter means includes at least two resistors, and a switch for selectively connecting these resistors to said power supply means for producing a bias current, and wherein the combining means combines said bias current and said variably attenuated second analogue output signal.

6. A digital to analogue converter as set forth in claim 2 wherein the first converter means produces a first analogue signal having a preselected maximum value and wherein the variable attenuator means is provided with separately variable circuits having parameters which can be varied in accordance with the permutations and combinations of the digits supplied to said first converter means and wherein said first analogue signals control the selection of said parameters such that the combined output analogue signal is continuous even at the boundary between the higher digits and the remaining digits of the input signal.

7. A digital to analogue converter as set forth in claim 2 wherein the second converter means is a weighted switch network which is controlled by all the input digits save the highest order digit and second highest order digit.

8. A digital to analogue converter as set forth in claim 2 wherein said polarity determining means comprises first DC means having a negative terminal connected to ground and a free positive terminal, second DC means having a positive terminal connected to ground and a free negative terminal, and switch means responsive to the highest order digit of one polarity for connecting said free positive terminal of said first DC means to said first converter means and further responsive to the highest order digit of a different polarity for connecting said free negative terminal of said second DC means to said first converter means to determine the polarity of the supplied digital signal.

9. A digital to analogue converter as set forth in claim 2 wherein said first converter means comprises a first resistor having one terminal connected to said polarity determining means, a second resistor having one terminal connected to said combining means, said first and second resistors having opposite terminals connected to a junction point, and switch means responsive to the second highest order digit having one polarity for connecting said junction point to ground and further responsive to the second highest order digit having a different polarity for disconnecting said junction point from ground for producing the first analogue signal.

10. A digital to analogue converter as set forth in claim 2 wherein said second converter means comprises at least a pair of first and second resistors and a pair of third and fourth resistors, said first and third resistors having corresponding one terminals connected to said polarity determining means, said second and fourth resistors having corresponding one terminals connected to said variable attenuator means, said first and second resistors having corresponding other terminals connected to a first junction point, said third and fourth resistors having corresponding other terminals connected to a second junction point, first switch means responsive to a third digit included in the remaining digits and having one polarity to connect said first junction point to ground and further responsive to the last-mentioned third digit having a different polarity to disconnect said first junction point from ground, and second switch means responsive to a fourth digit included in the remaining digits and having one polarity to connect said second junction point to ground and further responsive to the last-mentioned fourth digit having a different polarity to disconnect said second junction point from ground for producing the second analogue signal.

11. A digital to analogue converter as set forth in claim 2 wherein said variable attenuator means comprises a first resistor having one terminal connected to said second converter means, a second resistor having one terminal connected to said combining means, a third resistor having one terminal connected to other terminals of said first and second resistors, and switch means responsive to an additional digit included in the remaining digits and having one polarity to connect another terminal of said third resistor to ground and further responsive to said last-mentioned digit having a different polarity to disconnect said last-mentioned terminal from ground for attenuating the second signal under control of a characteristic of said first analogue signal.

12. A digital to analogue converter as set forth in claim 2 wherein said polarity determining means comprises first DC means having a negative terminal connected to ground and a free positive terminal, second DC means having a positive terminal connected to ground and a free negative terminal, and first switch means responsive to the highest order digit of one polarity for connecting said free positive terminal to said first converter means and further responsive to the highest order digit of a different polarity for connecting said free negative terminal to said first converter means to determine the polarity of the supplied digital signal;

said first converter means comprises a first resistor having one terminal connected to said first switch means, a second resistor having one terminal connected to said combining means, said first and second resistors having other terminals connected to a first junction point, and second switch means responsive to the second highest order digit having one polarity to connect said first junction point to ground and further responsive to the second highest order digit having a different polarity to disconnect said first junction point from ground for producing the first analogue signal;

said second converter means comprises at least third, fourth, fifth and sixth resistors, said third and fifth resistors having corresponding one terminals connected to said first switch means, said fourth and sixth resistors having corresponding one terminals connected to said variable attenuator means, said third and fourth resistors having opposite terminals connected to a second junction point, said fifth and sixth resistors having opposite terminals connected to a third junction point, third switch means responsive to a third digit included in the remaining digits and having one polarity to connect said second junction point to ground and further responsive to said last-mentioned one digit having a different polarity to disconnect said second junction point from ground, and fourth switch means responsive to a fourth digit included in the remaining digits and having one polarity to connect said third junction point to ground and further responsive to said last-mentioned digit having a different polarity to disconnect said third junction point from ground for producing the second analogue signal;

and said variable attenuator means comprises a seventh resistor having one terminal connected to the corresponding one terminals of said fourth and sixth resistors, an eighth resistor having one terminal connected to said combining means, a ninth resistor having one terminal connected to other terminals of said seventh an deighth resistors, and fifth switch means responsive to an additional digit included in the remaining digits and having one polarity to connect another terminal of said ninth resistor to ground and further responsive to said last-mentioned digit having a different polarity to disconnect said last-mentioned terminal from ground for attenuating the second analogue signal.

13. A digital to analogue signal converter comprising:

a digital signal input source for supply electrical signals representing a plurality of digits;

polarity determining means for determining the polarity of the supplied digital signal, comprising first DC means having a negative terminal connected to ground and a positive terminal, and second DC means having a positive terminal connected to ground and a negative terminal;

first converter means comprising first resistance means connected to said digital source and positive terminal of said first DC means, and second resistance means connected to said digital source and negative terminal of said second DC means, said first and second resistance means responsive to the highest and second highest order digits, respectively, for producing first and second portions, respectively, of a first analogue signal;

second converter means comprising at least a third resistance means connected to said digital source and said positive terminal of said first DC means, and at least a fourth resistance means connected to said digital source and said negative terminal of said second DC means, said third and fourth resistance means responsive to at least the third highest order digit for producing first and second portions, respectively, of a second analogue signal;

a variable attenuator means comprising fifth resistance means connected to said digital source and third resistance means to receive and variably attenuate said first portion of said second analogue signal under control of a characteristic of said first portion of said first analogue signal, and sixth resistance means connected to said digital source and fourth resistance means to receive and variably attenuate said second portion of said second analogue signal under control of a characteristic of said second portion of said first analogue signal;

and means for combining said first and second portions of said first analogue signal and attenuated first and second portions of said second analogue signal into a composite signal having a polarity determined by said polarity determining means.

14. A digital to analogue converter as set forth in claim 13 wherein said first converter means comprises said first resistance means having one end terminal connected to said positive terminal of said first DC means and an opposite end terminal connected to said combining means, first switch means responsive to the highest order digit having one polarity to connect a point intermediate said one and opposite end terminals of said first resistance means to ground and further responsive to said last-mentioned digit having a different polarity to disconnect said last-mentioned point from ground for producing said first portion of said first analogue signal, said second resistance means having one end terminal connected to said negative terminal of said second DC means and an opposite end terminal connected to said combining means, and second switch means responsive to the second highest order digit having one polarity to connect a point intermediate said one and opposite end terminals of said second resistance means to ground and further responsive to said last-mentioned digit having a different polarity to disconnect said last-mentioned point from ground for producing said second portion of said first analogue signal.

15. A digital to analogue converter as set forth in claim 13 wherein said second converter means comprises said third resistance means having one end terminal connected to said positive terminal of said first DC means and an opposite end terminal connected to said fifth resistance means, first switch means responsive to the third highest order digit having one polarity to connect a point intermediate said one and opposite end terminals of said third resistance means to ground and further responsive to said last-mentioned digit having a different polarity to disconnect said last-mentioned point from ground for producing said first portion of said second analogue signal, said fourth resistance means having one end terminal connected to said negative terminal of said second DC means and an opposite end terminal connected to said sixth resistance means, and second switch means responsive to the third highest order digit having one polarity to connect a point intermediate said one and opposite end terminals of said fourth resistance means to ground and further responsive to said last mentioned digit having a different polarity to disconnect said last-mentioned point from ground for producing said second portion of said second analogue signal.

16. A digital to analogue converter as set forth in claim 13 wherein said variable attenuator means comprises said fifth resistance means comprising a first resistor having having one terminal connected to said third resistance means, a second resistor having one terminal connected to said combining means, a third resistor having one terminal connected to other terminals of said fifth and second resistors, and first switch means responsive to an additional digit having one polarity to connect another terminal of said third resistor to ground and further responsive to said last-mentioned digit having a different polarity to disconnect said last-mentioned terminal from ground for variably attenuating said first portion of said second analogue signal under control of a characteristic of said first portion of said first analogue signal, and said sixth resistance means comprising a fourth resistor having one terminal connected to said fourth resistance means, a fifth resistor having one terminal connected to said combining means, a sixth resistor having one terminal connected to other terminals of said fourth and fifth resistors, and second switch means responsive to said last-mentioned additional digit having said one polarity to connect another terminal of said sixth resistors to ground and further responsive to said last-mentioned additional digit having said different polarity to disconnect said last-mentioned terminal from ground for variably attenuating said second portion of said second analogue signal under control of a characteristic of said second portion of said first analogue signal.

17. A digital to analogue converter as set forth in claim 13 wherein said first converter means comprises said first resistance means having one end terminal connected to said positive terminal of said first DC means and an opposite end terminal connected to said combining means, first switch means responsive to the highest order digit having one polarity to connect a point intermediate said one and opposite end terminals of said first resistance means to ground and further responsive to said last-mentioned digit having a different polarity to disconnect said last-mentioned point from ground for producing said first portion of said first analogue signal, said second resistance means having one end terminal connected to said negative terminal of said second DC means and an opposite end terminal connected to said combining means, and second switch means responsive to the second highest order digit having one polarity to connect a point intermediate said one and opposite end terminals of said second resistance means to ground and further responsive to said last-mentioned digit having a different polarity to disconnect said last-mentioned point from ground for producing said second portion of said first analogue signal;

said second converter means comprises said third resistance means having one end terminal connected to said positive terminal of said first DC means and an opposite end terminal connected to said fifth resistance means, third switch means responsive to said third highest order digit having one polarity to connect a point intermediate said one and opposite end terminals of said third resistance means to ground and further responsive to said last-mentioned digit having a different polarity to disconnect said last-mentioned point from ground for producing said first portion of said second analogue signal, said fourth resistance means having one end terminal connected to said negative terminal of said second DC means and an opposite end terminal connected to said sixth resistance means, and fourth switch means responsive to said third highest order digit having one polarity to connect a a point intermediate said one and opposite end terminals of said fourth resistance means to ground and further responsive to said last-mentioned digit having a different polarity to disconnect said last-mentioned point from ground for producing said second portion of said second analogue signals;

and said variable attenuator means comprises said fifth resistance means including a first resistor having one terminal connected to said third resistance means, a second resistor having one terminal connected to said combining means, a third resistor having one terminal connected to other terminals of said first and second resistors, and fifth switch means responsive to an additional digit having one polarity to connect another terminal of said third resistor to ground and further responsive to said last-mentioned digit having a different polarity to disconnect said last-mentioned terminal from ground for variably attenuating said first portion of said second analogue signal under control of a characteristic of said first portion of said first analogue signal;

and said sixth resistance means comprising a fourth resistor having one terminal connected to said fourth resistance means, a fifth resistor having one terminal connected to said combining means, a sixth resistor having one terminal connected to other terminals of said fourth and fifth resistors, and sixth switch means responsive to said last-mentioned additional digit having one polarity to connect another terminal of said sixth resistor to ground and further responsive to said last-mentioned digit having a different polarity to disconnect said last-mentioned terminal from ground for variably attenuating said second portion of said second analogue signal under control of a characteristic of said second portion of said first analogue signal.

18. A digital to analogue signal converter comprising:
a digital signal input source for supplying electrical signals representing a plurality of digits;
polarity determining means for determining the polarity of the supplied digital signal, including
first DC means having a negative terminal connected to ground and a positive terminal,
and second DC means having a positive terminal connected to ground and a negative terminal;
first converter means including
first resistance means connected to said source and having one terminal connectable to and disconnectable from said positive terminal of said first DC means,
second resistance means connected to said source and having one terminal connectable to and disconnectable from said negative terminal of said second DC means, said first and second resistance means connectable to and disconnectable from said positive and negative terminals of said first and second DC means, respectively, in response to the highest and second highest order digits, respectively, for producing first and second portions, respectively, of a first analogue signal;
second converter means including
at least a third resistance means connected to said source and having one terminal connectable to and disconnectable from said positive terminal of said first DC means,
at least a fourth resistance means connected to said source and having one terminal connectable to and disconnectable from said negative terminal of said second DC means, said third and fourth resistance means connectable to and disconnectable from said positive and negative terminals of said first and second DC means, respectively, in response to at least the third highest order digital for producing first and second portions, respectively, of a second analogue signal;
fifth resistance means having opposite terminals connected to other terminals of said third and fourth resistance means for providing said last-mentioned resistance means with non-linear characteristics;
variable attenuator means connected to a resistance point intermediate said opposite terminals of said fifth resistance means to receive and variably attenuate said first and second portions of said second analogue signal under control of a characteristic of said first and second portions of said first analogue signal;
and means for combining said first and second portions of said first analogue signal and attenuated portions of second analogue signal into a composite signal having a polarity determined by said polarity determining means.

19. A digital to analogue converted as set forth in claim 18 wherein
said first converter means comprises said first resistance means including a first resistor having said one terminal connectable to and disconnectable from said positive terminal of said first DC means and also having an opposite terminal connected to said combining means,
first switch means responsive to the highest order digit having one polarity to connect said one terminal of said first resistor to said positive terminal of said first DC means and further responsive to said last-mentioned digit having a different polarity to disconnect said last-mentioned one terminal from said last-mentioned positive terminal for producing said first portion of said first analogue voltage,
said second resistance means including a second resistor having said one terminal connectable to and disconnectable from said negative terminal of said second DC source and also having an opposite end connected to said combining means,
and second switch means responsive to the second highest order digit having one polarity to connect said one terminal of said second resistor to said negative terminal of said second DC means and further responsive to said last-mentioned digit having a different polarity to disconnect said last-mentioned one terminal from said last-mentioned negative terminal for producing said second portion of said first analogue signal;
said second converter means comprises said third resistance means including a third resistor having said one terminal connectable to and disconnectable from said positive terminal of said first DC means and also having another terminal connected to one of said opposite terminals of said fifth resistance means,
third switch means responsive to the third highest order digit having one polarity to connect said one terminal of said third resistor to said positive terminal of said first DC means and further responsive to said last-mentioned digit having a different polarity to disconnect said last-mentioned one terminal from said positive terminal of said first DC means for producing said first portion of said second analogue signal,
said fourth resistance means including a fourth resistor having said one terminal connected to and disconnected from said negative terminal of said second DC means and also having another terminal connected to a second of said opposite terminals of said fifth resistance means,
and fourth switch means responsive to the third highest order digit having one polarity to connect said one terminal of said fourth resistor to said negative terminal of said second DC means and further responsive to said last-mentioned digit having a different polarity to disconnect said last-mentioned one terminal from said last-mentioned negative terminal for producing said second portion of said second analogue signal;
said fifth resistance means comprises at least two serially connected fifth and sixth resistors, said fifth resistor having one of said opposite terminals connected to said another terminal of said third resistor and said sixth resistor having a second of said opposite terminals connected to said another terminal of said fourth resistor, said serially connected fifth and sixth resistors having other terminals connected to a junction point constituting said intermediate resistance point;
and said variable attenuator means comprises a seventh resistor having one terminal connected to said last-mentioned junction point, an eighth resistor having one terminal connected to said combining means, a ninth resistor having one terminal connected to other terminals of said seventh and eighth resistors,
and fifth switch means responsive to an additional digit having one polarity to connect another terminal of said ninth resistor to ground and further responsive to said last-mentioned additional digit having a different polarity to disconnect said last-mentioned another terminal from ground for variably attenuating said first and second portions of said second analogue signal under said characteristic of said first and second portions of said first analogue signal.

20. A signal converter comprising:
(A) an analogue signal input source;
(B) means for generating more than two digital signals representative of said input analogue signal;
(C) converter means for converting said digital signals into a composite analogue output signal, said converter means including:

(1) first means responsive to the two highest order digits of which one has a signficant polarity for generating a first analogue signal;

(2) second means responsive to the remaining digits for generating a second analogue signal;

(D) variable attenuator means connected to receive and variably attenuate said second analogue signal under control of a characteristic of said first analogue signal;

(E) means for combining said first analogue signal and second variably attenuated analogue signal into a composite analogue signal having a polarity determined by said significant polarity of said one digit;

(F) and comparator means connected to receive and compare the input and composite analogue signals for producing an error output signal indicative of the difference in current magnitude therebetween, said error signal activating said digital generating means to generate said digital signals to tend to decrease the current magnitude difference between said compared input and composite analogue signals.

21. In a signal converter for converting digital signals into a composite analogue signal, the combination comprising: first conversion means responsive to the two highest order digital signals of which one has a significant polarity for producing a first analogue signal; second conversion means responsive to the remaining digital signals for producing a second analogue signal; variable attenuation means controlled by a characteristic of said first analogue signal, to receive and variably attenuate said second analogue signal; and means for combining said first analogue signal and variably attenuated second analogue signal into a composite signal having a polarity determined by said significant polarity of said one digit.

References Cited

UNITED STATES PATENTS

| | | | |
|---|---|---|---|
| 3,290,671 | 12/1966 | Lamoureux | 340—347 |
| 3,293,635 | 12/1966 | Jankovich | 340—347 |

MAYNARD R. WILBUR, *Primary Examiner.*

W. J. KOPACZ, *Assistant Examiner.*